United States Patent Office 3,568,379
Patented Mar. 9, 1971

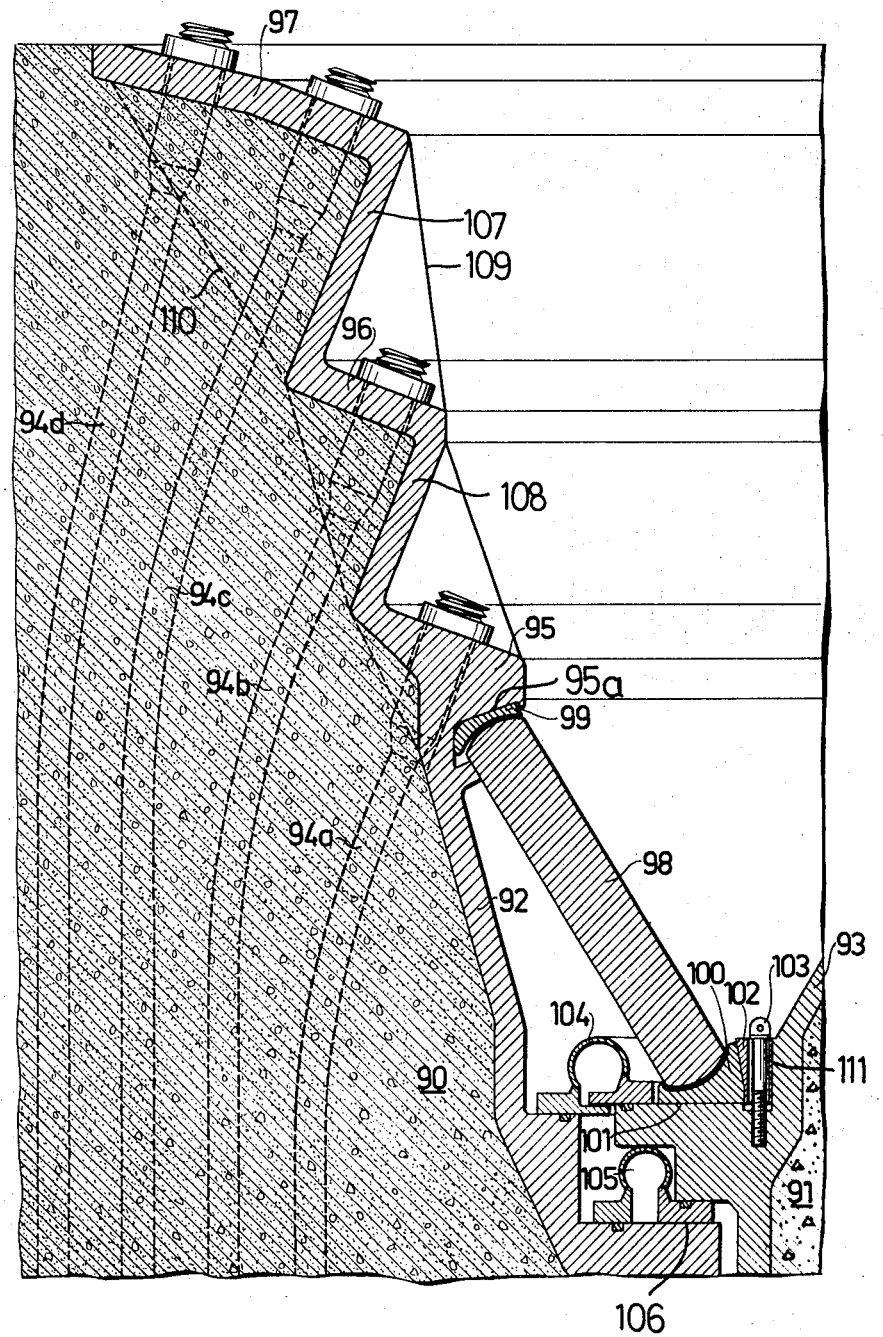

3,568,379
PRESTRESSED CONCRETE PRESSURE VESSEL
Erik Borje Johnsson, Stockholm, Taivo Tarandi, Lidingo, and Per Kurt Luthman, Stockholm, Sweden, assignors to Aktiebolaget Atomenergi, Stockholm, Sweden
Filed Nov. 14, 1968, Ser. No. 775,683
Claims priority, application Sweden, Dec. 11, 1967, 17,018/67; Nov. 7, 1968, 15,127/68
Int. Cl. E04h 7/20
U.S. Cl. 52—21
12 Claims

ABSTRACT OF THE DISCLOSURE

A prestressed concrete pressure vessel comprises a concrete vessel, axial prestressing cable and circumferential pretressing cables. The vessel has a lid and an inner steel lining. The upper portion of the steel lining is designed as a comparatively rigid steel structure having a shoulder for supporting the lid and shoulders for fastening the upper ends of the axial prestressing cables.

---

Figure 1:
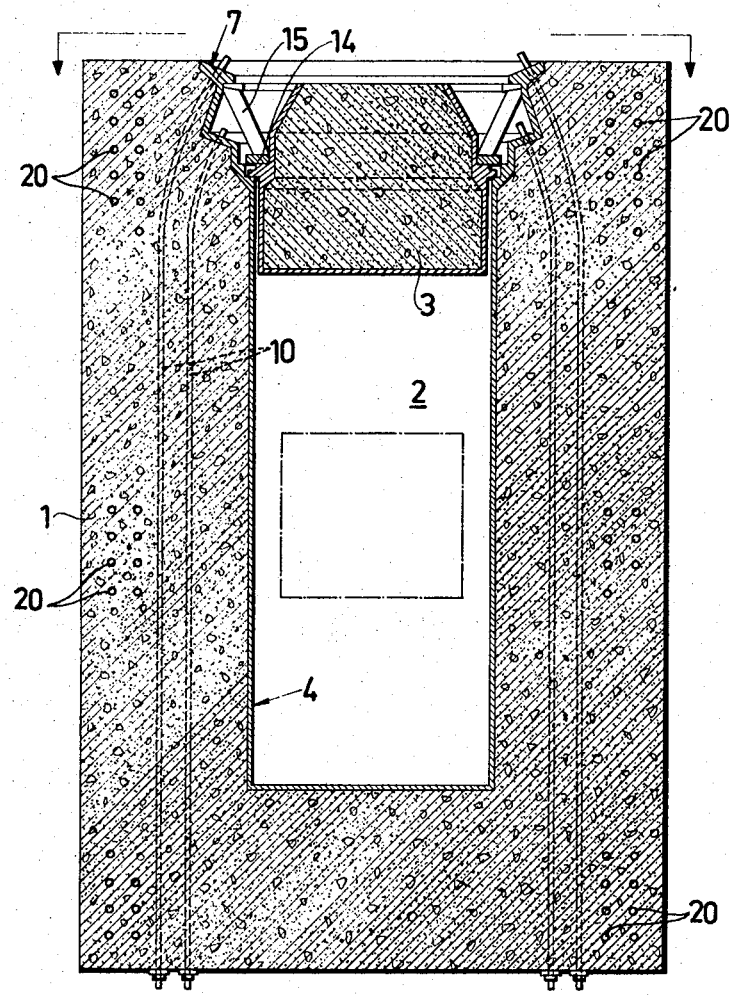

The invention relates to a prestressed concrete pressure vessel, particularly a large prestressed concrete pressure vessel with a concrete lid. The pressure vessel according to the invention is primarily intended to be used as a pressure vessel for a nuclear reactor, especially a reactor that is cooled and moderated by water.

In prestressed concrete pressure vessels it is known to provide a first set of prestressing cables extending axially through the wall of the pressure vessel, and a second set of prestressing cables, extending circumferentially. It also belongs to the prior art to provide a steel lining on the interior wall of the pressure vessel. It also belongs to the prior art to provide a shoulder in the pressure vessel, and to fasten a lid in the pressure vessel by means of locking members engaging the lid and the pressure vessel. The force acting on the lid, being a result of the contents of the pressure vessel being pressurized, is transferred to the wall of the pressure vessel, resulting in complicated problems as far as the distribution of the loads on the concrete and the prestressing cables is concerned.

It is an object of the invention to provide a prestressed concrete pressure vessel having a lid which can easily be mounted and dismounted. It is another object of the invention to provide a prestressed concrete pressure vessel in which the pressure of the pressurized contents of the vessel is transferred from the lid to the wall of the vessel in such a way as to distribute the pressure evenly to the axial prestressing cables. It is another object of the invention to provide a pressure vessel in which the lid is fastened in such a way that the pressurization of the contents of the vessel does not result in any significant movement of the lid relative to the vessel. It is another object of the invention to provide a pressure vessel in which the steel lining is anchored or fastened to the wall of the vessel in a reliable way.

The prestressed concrete pressure vessel of the invention comprises a concrete vessel, prestressing cables extending substantially axially through the pressure vessel, circumferential prestressing cables, a cavity in the concrete vessel, a lid to close said cavity, a steel lining on the wall of said cavity, the portion of the steel lining adjacent the opening of the cavity being a rigid steel structure, a first shoulder in said rigid steel structure for supporting said lid, a second shoulder in said rigid steel structure, locking members engaging said lid and said second shoulder for fastenng the lid to the rigid steel structure, and at least one anchoring shoulder in said rigid steel structure, the upper ends of at least part of said axial prestressing cables being anchored to said anchoring shoulder.

Some, or all, of the axial prestressing cables can be used to anchor the upper, rigid portion of the steel lining to the concrete. Preferably, at least two anchoring shoulders at different levels of the upper rigid portion of the steel lining should be connected to the cables, namely so that an outer ring of cables will be connected to an upper anchoring shoulder on the rigid steel structure, while an inner ring of cables will be connected to a lower anchoring shoulder on the rigid steel structure. According to a preferred embodiment of the invention the shoulder for fastening the lid to the pressure vessel shall be situated at the same level, or at a lower level, than the lower anchoring shoulder.

Figure 2:
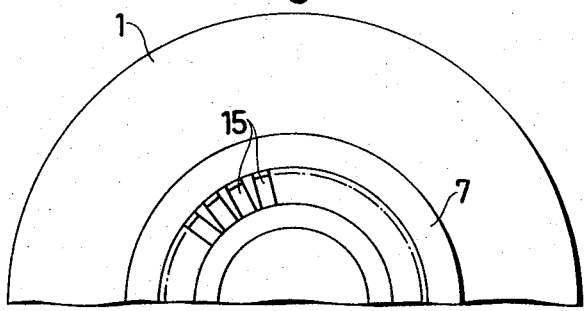
Figure 3:
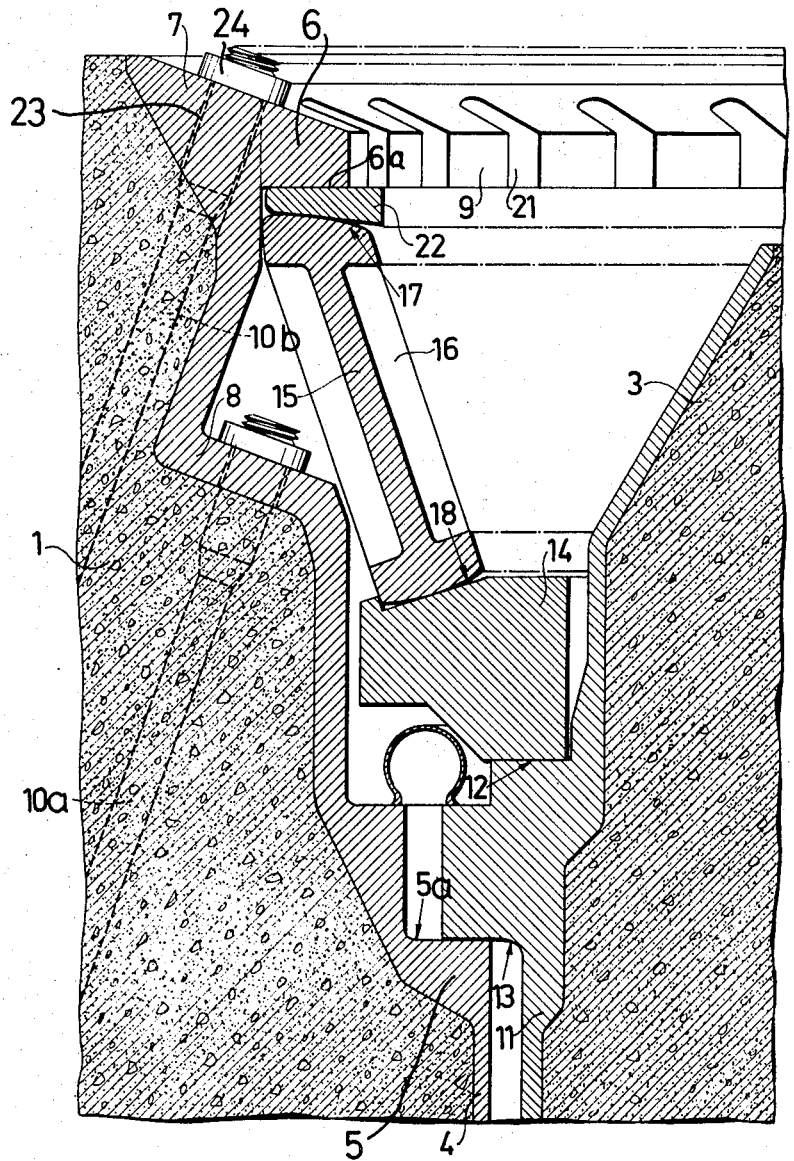

In the following, the invention will be more fully described with reference to the accompanying drawings. FIG. 1 shows an axial section through a prestressed concrete pressure vessel with lid according to the invention. FIG. 2 shows the pressure vessel according to FIG. 1 as seen from above. FIG. 3 shows, on a larger scale, the arrangement for fastening the lid of the pressure vessel according to FIG. 1. FIGS. 4–7 show, in a manner corresponding to FIG. 3, four other designs for retaining the lid in position.

The prestressed concrete pressure vessel according to FIGS. 1–3 comprises a pressure vessel 1 of concrete which has been prestressed partly by means of cables or tension irons 10 which extend in an axial direction and partly by cables 20 extending in a circumferential direction to the wall of the pressure vessel. The manufacture of a prestressed concrete pressure vessel of this general type is well known to a person skilled in the art, and shall not be described in detail here. The prestressing cables are usually situated in tubes which have not, however, been disclosed in the drawings.

The upper ends of the axial prestressing cables 10 are placed at different levels. They are fastened to a comparatively rigid iron member 7, 8 which distributes the prestressing forces in the concrete. The iron member 7, 8 forms an extension of a steel lining 4 which covers the wall of the interior space 2 of the pressure vessel. This inner space 2 is intended to contain a nuclear reactor which is not shown, however. The iron member 7, 8 is provided with a shoulder 5 having a horizontal surface 5a turned upwards, and a second shoulder 6 having a horizontal surface 6a turned downwards, said latter shoulder 6 being located at a higher level than the first shoulder 5. Shoulder 6 is divided at various places by radial slits 21 which define a plurality of supports 9. If a crack occurs in one support 9 the slits 21 prevent said crack from extending to the adjacent supports. The steel lining is further provided with two anchoring shoulders 7 and 8. The anchoring shoulder 7 is contiguous to the shoulder 6 referred to above. The upper ends of a first set of cables 10a are fastened to the anchoring shoulder 8, and the upper ends of a second set of cables 10b are fastened to the anchoring shoulder 7. The upper portions of the cables 10 are bent somewhat from the line of axis. The upper surfaces of the anchoring shoulders 7, 8 incline somewhat to the horizontal, so as to extend at right angles to said upper portions of the cables 10. The upper ends of the cables 10 are fastened to sleeves 23 having a screw-threaded surface. A nut 24 is mounted on each screw-threaded sleeve 23. For prestressing a cable a hydraulic tool is fastened to the end of the sleeve extending above the nut the cable is drawn to the desired tension by means of the tool, it being understood that the other end of the cable having first been anchored to the bottom of the pressure vessel. The nut 24 is now rotated until it engages the surface of the anchoring shoulder. The tool is now loosened from the sleeve, and is used for prestressing another cable.

The under and side surfaces of the lid 3 are provided with a steel covering 11. This covering is provided with a shoulder 13, by means of which the lid rests on shoulder 5 on the steel lining of the pressure vessel. A massive steel ring 14, running around the lid 3, rests on a second shoulder 12 on the steel covering 11. The steel ring 14 supports the lower ends of a plurality of locking members 15 which are located contiguous to one another around the whole lid. The locking members are shaped as girders with a center part 15 and two flanges 16 in order to be able to resist the largest possible pressure load. The upper surfaces 17 and lower 18 surfaces of the locking members are rounded off cylindrically. The locking member 15 lies in contact with the second shoulder 6 of the pressure vessel through a wedge 22. The angle of the wedge is chosen so as to make the wedge self-securing; i.e., the wedge cannot be forced out of position by the pressure acting on the locking member 15.

Sealing between the pressure vessel and the lid is taken care of by a so-called toroidal sealing; i.e. a sealing member 19 which is mainly ring-shaped in cross section and whose edges are welded to the steel linings of the pressure vessel and the lid.

During assembly, lid 3 is first brought into position. Next, the sealing member 19 is fastened by welding, and then ring 14 is placed on the shoulder 12. The locking members 15 are then brought into the position indicated in the drawing. Finally, the wedges 22 are driven in with the required force to insure that the whole assembly will not be loose. When the pressure vessel is set under internal pressure the lid 3 will not move vertically to any appreciable degree since there is no margin of play in the vertical direction. On the other hand, the locking members will allow radial movement between the points of support to provide for dimensional changes caused, for example, by heat. The cylindrical surfaces 17 and 18 of the locking members will thereby "roll" somewhat on the surfaces of the wedges 22 and the ring 14.

Figure 4:
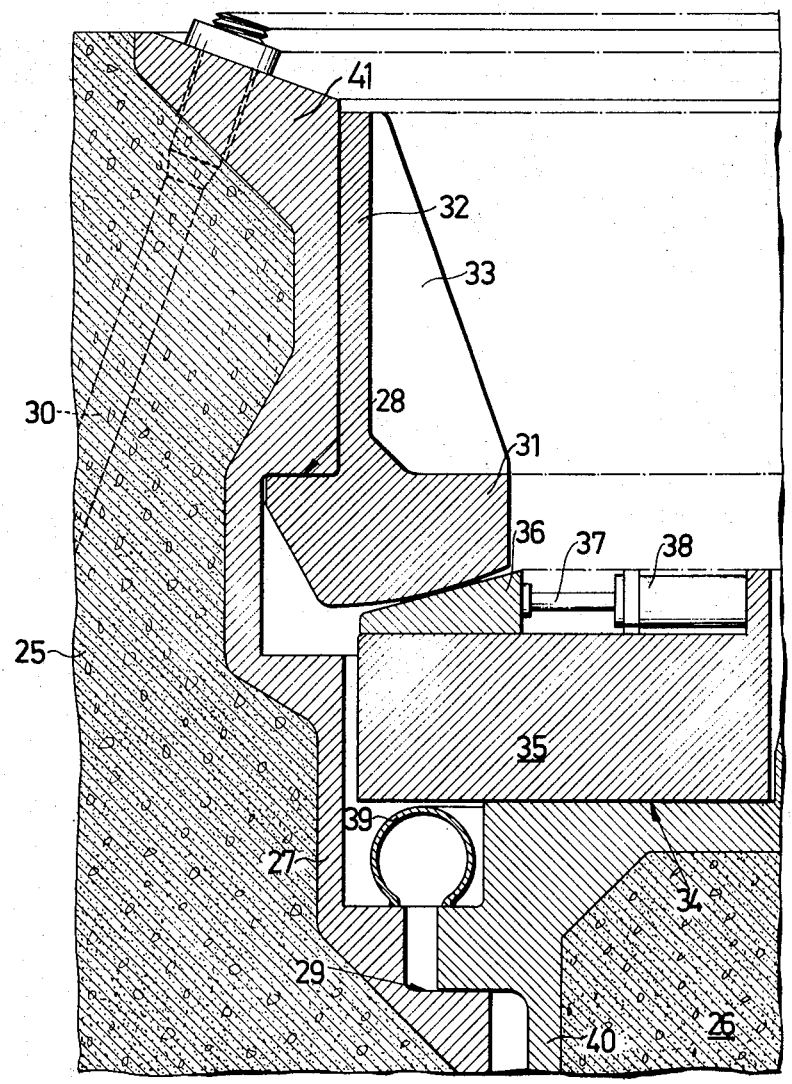

In the embodiment according to FIG. 4, the rigid steel structure 27 of the pressure vessel has a first shoulder 29 to support the lid 26, and a second shoulder 28 to engage the locking members 31. The steel structure 27 is anchored to the concrete by means of cables 30 in a manner that is to a large extent the same as in FIGS. 1–3. The upper ends of the cables 30 are fastened to an anchoring shoulder 41 at the top of the steel structure 27. The locking members 31 have a portion 32 which extends upwards to engage the inner wall of the pressure vessel at a level above the shoulder 28. The locking members 31 also have a stiffening flange 33. A ring 35 is arranged on the shoulder 34 of the lid 26 and wedges 36 are arranged between the ring 35 and the locking members 31. Each wedge 36 is connected by means of a bar 37 to a piston in a hydraulic cylinder 38 which is mounted on the ring 35. With the aid of the hydraulic cylinder the wedge 36 can be brought to and from the indicated position, and can also be held in that position with the required force. Sealing between the pressure vessel and the lid is taken care of by an annular toroidal member 39, which, before the ring 35 is put in place, is welded to the steel linings 27 and 40.

Figure 5:
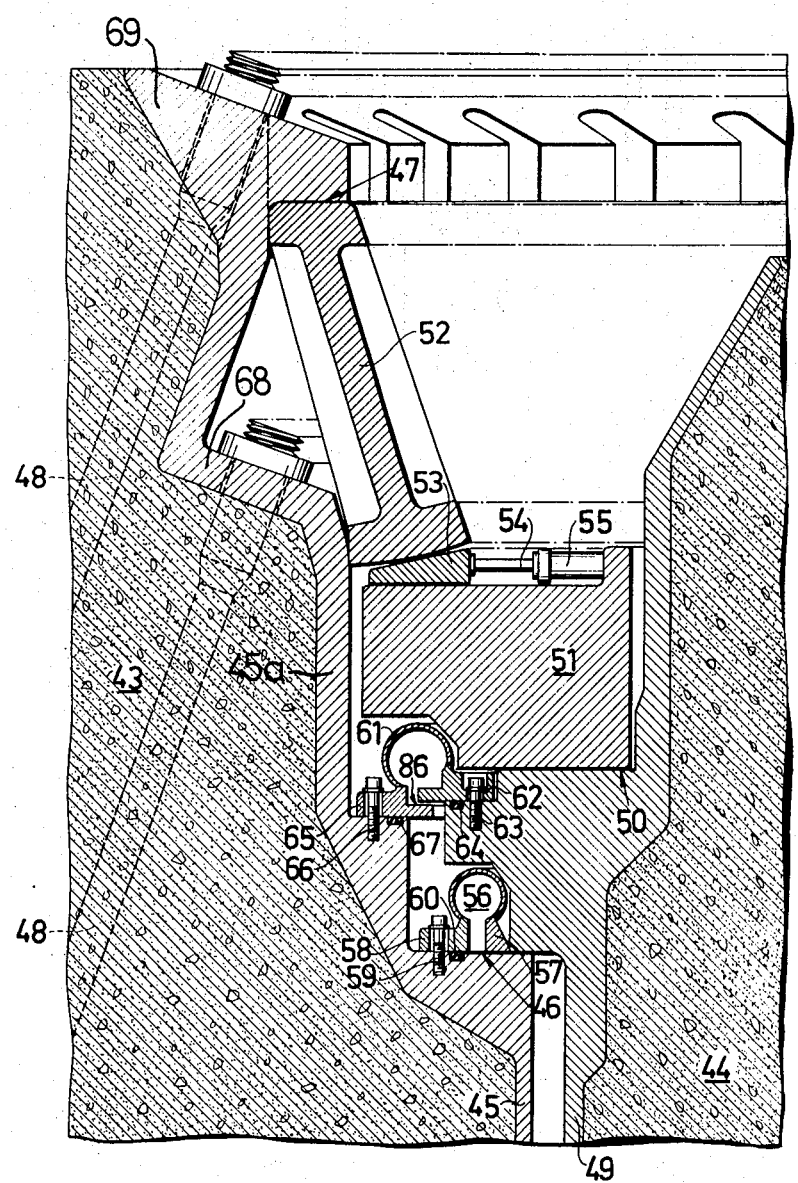

In the embodiment according to FIG. 5, the steel lining 45 of the pressure vessel 43 has an upper, rigid portion 45a. Said rigid portion 45a has a first shoulder 46 on which the lid 44 rests, and a second shoulder 47 which engages locking members 52 in the same manner as that described in connection with FIG. 3. The rigid steel structure 45a is held anchored to the concrete by means of cables 48 in the same manner as that described in connection with FIG. 3. The cables 48 are fastened to two anchoring shoulders 68, 69 on different levels. The upper anchoring shoulder 69 is contiguous to the shoulder 47 referred to above. The steel covering 49 of the lid 44 has a shoulder 50 which supports a ring 51. This ring supports a number of wedges 53, one wedge for each locking member 52. The wedges can be manoeuvered by means of a bar 54 and a hydraulic cylinder in the same manner as that described in connection with FIG. 4. The wedge 53 is in contact with the lower end of the locking member 52, while the upper end of the locking member is in direct contact with the second shoulder 47 of the pressure vessel.

Sealing between the pressure vessel and the lid is taken care of by two toroidal rings 56 and 61. The first toroidal ring 56 has an extension 57 which is welded to the steel covering 49 of the lid, and a second extension 58 which, by means of screws 59, is fastened to the rigid steel structure 45a. A sealing ring 60 is laid in a groove in the shoulder 46. The second toroidal ring 61 has extensions 62 and 65 which, by means of screws 63 and 66, are fastened to the rigid steel structure 45a and to the steel covering 49. Sealing rings 64 and 67 are positioned in grooves in the rigid steel structure and the steel covering.

The opposite faces of the extensions 62 and 65 overlap one another to form a narrow space 86 which throttles any flow of fluid that might occur as a result of a breakdown of both sealing devices 56, 61. The overlapping portions also serve the purpose of protecting the toroidal ring 61 from fragments originating from the toroidal ring 56, should said lower toroidal ring 56 be damaged. During assembly, the lid with attached toroidal ring 56 is brought into position, the screws 59 are screwed down, the toroidal ring 61 is mounted, the ring 51 is brought into position, the locking members 52 are brought into position, and the wedges 53 are driven into the indicated position with the required force.

Figure 6:
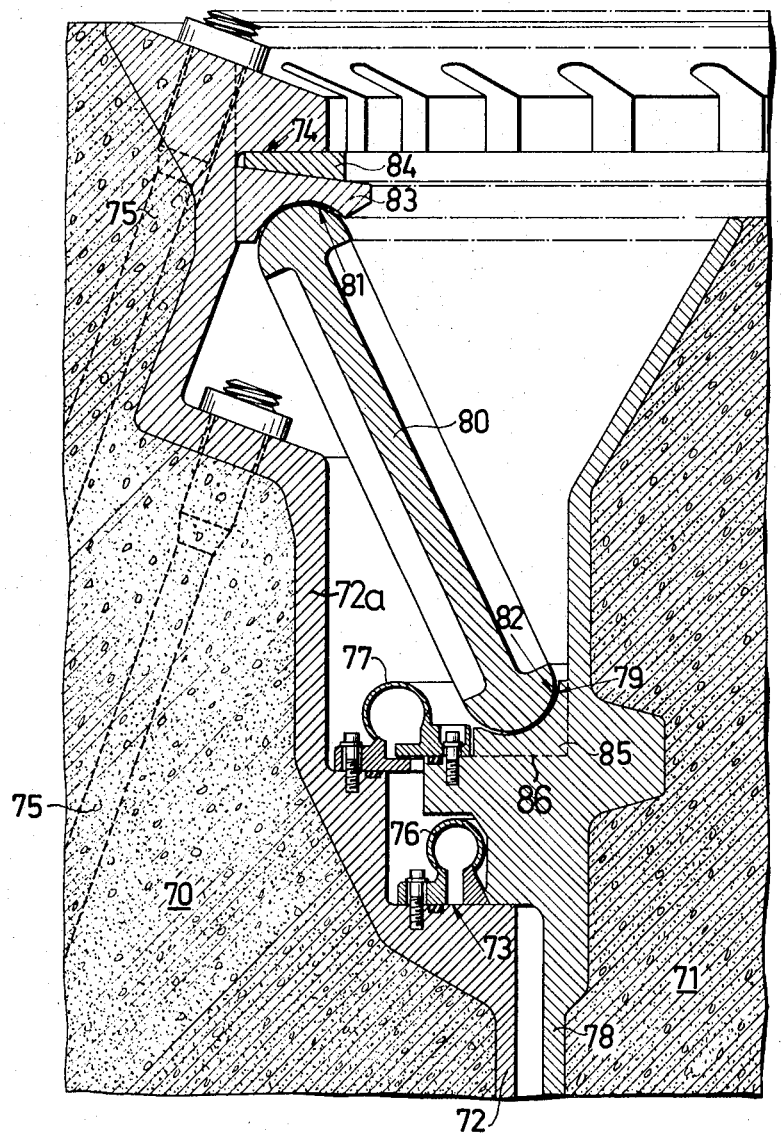

In the embodiment according to FIG. 6, the steel lining 72 of the pressure vessel 70, the rigid steel structure 72a, the two shoulders 73 and 74 of the rigid steel structure 72a, the prestressing cables 75, the toroidal sealers 76 and 77, all are the same as that described in connection with FIG. 5. The steel covering 78 of the lid 71 has a shoulder 79 with a circular cross section. This shoulder 79 supports a number of locking members 80, the under surfaces 82 of which are cylindrical and have a somewhat smaller radius of curvature than the shoulder 79. To improve the distribution of the load and to facilitate manufacturing, the shoulder 79 can be divided into a number of sections 85, one for each locking member 80, said sections 85 resting on a shoulder 86. The upper surface 81 of the locking member 80 is also cylindrical and engages a spacer 83 having a cylindrical surface having a somewhat larger radius of curvature. A wedge 84 is arranged between this spacer 83 and the second shoulder 74 of the pressure vessel. Because of the cylindrical surfaces 81, 82 the load on the locking member 80 will always be only a pressure load without any torque, even if the lid 71 should move somewhat radially because of thermal expansion.

In the embodiment illustrated in FIG. 7 the pressure vessel 90 has a steel lining, the upper portion of which consists of an annular, rigid steel structure 92. Said rigid steel structure has a shoulder 106 to support a lid 91, and three anchoring shoulders 95–97 for the axial pre-stressing cables 94. Said cables comprise four sets, viz. a first set 94a fastened to the shoulder 95, a second set 94b fastened to the shoulder 96, and third and fourth sets 94c and 94d fastened to the shoulder 97. The wall portions 107, 108 between the anchoring shoulders 95–97 extend at right angles to said anchoring shoulders, that is parallel to the upper ends of the cables 94. For increasing the rigidity of the steel structure 92 stiffening plates 109, 110 have been fastened by welding in the corners defined by a wall portion 107, 108 and the adjacent anchoring shoulders 95–97.

The steel covering 93 of the lid 91 has a horizontal shoulder 101 which supports spacers 100 which serve as supports for the lower end of the locking members 98. The upper end of the locking member engages a spacer 99 which engages the lower surface 95a of the lowermost anchoring shoulder 95. The locking members 98 have an inclination of approximately 30° to the vertical. Consequently, by moving the spacer 100 on the shoulder 101 it is possible to pre-load the locking member 98 to such a degree that there will be no play or clearance between the various parts of the locking assembly. The spacer 100 is now fixed in the desired position by means of a wedge 102 which is inserted in the vertical direction between the spacer 100 and a vertical surface 111 on the steel covering 93. The wedge 102 may be mounted and dismounted by means of a crane. The wedge 102 is secured by means of a screw 103.

Toroidal rings 104 and 105 provide a sealing between the pressure vessel and the lid in approximately the same way as has been described with reference to FIG. 5.

The pressurization of the contents of the pressure vessel results in an upward force on the lid 91, and said force is transferred through the locking members 98 to the rigid steel structure 92. Said upward force attacks the rigid steel structure on the surface 95a which is positioned approximately at the same level as the lowest anchoring shoulder 95. Consequently, the load on the rigid steel structure 92 and the adjacent portions of the concrete will be a compressive stress, tensile stresses being avoided.

What is claimed is:

1. A prestressed concrete pressure vessel comprising a concrete vessel having a cavity therein and an opening thereinto, a plurality of prestressed cables extending substantially axially through the wall of said vessel and circumferentially thereof, a lid element for closing the opening into the cavity, a steel lining surrounding the inner wall of said cavity and provided with an upper rigid steel structure adjacent the opening into the cavity and said lid element, said rigid steel structure having a first shoulder for supporting said lid element, a plurality of second shoulders, disposed above said first shoulder and anchoring shoulders to which the upper ends of said cables are attached, a plurality of locking members engaging said lid element and said second shoulders for securing the lid to the rigid steel structure, flexible sealing members between the rigid steel structure and said lid, and means cooperating with said locking members to permit radial movement of said vessel with respect to said lid element without permitting vertical movement of said lid element with respect to the opening into the cavity when dimensional changes occur due to pressure variations within said vessel.

2. A pressure vessel as claimed in claim 1 wherein the upper portions of the plurality of said prestressed cables are inclined inwardly away from the outer wall of said vessel.

3. A pressure vessel as claimed in claim 1 wherein the anchoring shoulders extend at right angles to the axes of the upper end of the prestressed cables.

4. A pressure vessel as claimed in claim 1 wherein two substantially concentric sets of prestressed cables are provided, the outer set thereof terminating above the inner set of prestressed cables, and wherein the anchoring shoulders are provided in said rigid steel structure for both sets of said prestressed cables.

5. A pressure vessel as claimed in claim 4 wherein the second shoulders of said rigid steel structure are disposed adjacent the lowermost anchoring shoulder.

6. A pressure vessel as claimed in claim 4 and further comprising stiffening members provided between the anchoring shoulders and upwardly extending wall portions of said rigid steel structure.

7. A pressure vessel as claimed in claim 1 and further comprising means for providing a desired pre-load to the locking members.

8. A pressure vessel as claimed in claim 7 and further comprising wedging means cooperating with said locking members for providing the desired pre-load to said locking members.

9. A pressure vessel as claimed in claim 8 and further comprising hydraulic means for operating said wedging means.

10. A prestressed concrete pressure vessel, comprising a concrete vessel having a cavity therein, a lid element for closing said cavity, a steel lining on the wall of said cavity, the portion of the steel lining adjacent the opening of the cavity being a rigid steel structure, a first shoulder in said rigid steel structure for supporting said lid, a second shoulder in said rigid steel structure, locking members engaging said lid and said second shoulder for fastening the lid to the rigid steel structure, said locking members extending between the periphery of the lid and the second shoulder generally angularly relative to the longitudinal axis of the vessel, said locking members having means thereon engaging said lid periphery and said second shoulders which permits relative radial movement but inhibits relative axial movement between said lid and said vessel walls, at least two anchoring shoulders in said rigid steel structure, circumferential prestressing cables in the concrete vessel, a first set of axial prestressed cables in the concrete vessel, the upper ends of which are fastened to the first lower, anchoring shoulder, and a second set of axial prestressed cables in the concrete vessel, being more remote from the axis of the pressure vessel, the upper ends of which are fastened to the second, upper, anchoring shoulder.

11. A pressure vessel as claimed in claim 10, in which the locking members are elongated members extending generally in an upward-outward direction from said lid to said second shoulder and having a lower end engaging said lid and an upper end engaging said second shoulder.

12. A prestressed concrete pressure vessel comprising a concrete vessel having a cavity therein and an opening thereinto, a plurality of prestressed cables extending substantially axially through the wall of said vessel and circumferentially thereof, a lid element for closing the opening into the cavity, a steel lining surrounding the inner wall of said cavity and provided with an upper rigid steel structure adjacent the opening into the cavity and said lid element, said rigid steel structure having a first shoulder for supporting said lid element, a second shoulder disposed above said first shoulder and anchoring shoulders to which the upper ends of said cables are attached, a plurality of locking members engaging said lid element and said second shoulder for securing the lid to the rigid steel structure, at least one flexible toroidal sealing member between the rigid steel structure and said lid, and means cooperating with said locking members to permit radial movement of said vessel with respect to said lid element without permitting vertical movement of said lid element with respect to the opening into the cavity when dimensional changes occur due to heat and pressure variations within said vessel.

References Cited

UNITED STATES PATENTS

| | | | |
|---|---|---|---|
| 2,252,488 | 8/1941 | Bierend | 220—55/O |
| 2,729,491 | 1/1956 | Sieder | 292—256.6 |
| 2,776,853 | 1/1957 | Billstrom | 292—256 |
| 2,786,704 | 3/1957 | Presdee | 292—256 |
| 2,913,798 | 11/1959 | Brequet | 52—224 |
| 2,937,782 | 5/1960 | Heimberger | 220—46/MS |
| 3,349,524 | 10/1967 | Fistedis | 52—224 |
| 3,353,859 | 11/1967 | Schupack | 52—224 |
| 3,390,211 | 6/1968 | Ziegler | 52—224 |

FOREIGN PATENTS

| | | | |
|---|---|---|---|
| 903,569 | 1945 | France | 220—46/MS |

HENRY C. SUTHERLAND, Primary Examiner

U.S. Cl. X.R.

52—224; 220—3, 46, 55